United States Patent [19]

Avondoglio

[11] Patent Number: 4,877,431
[45] Date of Patent: Oct. 31, 1989

[54] RADIAL IMPINGEMENT SEPARATOR

[75] Inventor: Leo Avondoglio, Ivoryton, Conn.

[73] Assignee: Aercology Incorporated, Old Saybrook, Conn.

[21] Appl. No.: 257,538

[22] Filed: Oct. 14, 1988

[51] Int. Cl.$^4$ .................................................. B01D 50/00
[52] U.S. Cl. .......................................... 55/321; 55/337; 55/345; 55/443; 55/455; 55/457
[58] Field of Search .................. 55/320, 321, 337, 426, 55/345, 440, 442–446, 453, 455, 457

[56] References Cited

U.S. PATENT DOCUMENTS

| | | |
|---|---|---|
| 552,572 | 1/1896 | Austin . |
| 2,157,829 | 5/1939 | Metzgar . |
| 2,976,954 | 3/1961 | Irwin .................................. 55/440 X |
| 3,566,585 | 3/1971 | Voloshen et al. ................. 55/443 X |
| 3,713,279 | 1/1973 | Moore ................................ 55/457 X |
| 3,800,514 | 4/1974 | Avondoglio et al. ................. 55/319 |
| 3,857,687 | 12/1974 | Hamilton et al. ...................... 55/337 |
| 3,876,396 | 4/1975 | Arnold et al. ..................... 55/440 X |
| 4,014,671 | 3/1977 | Andro et al. ........................... 55/325 |
| 4,214,883 | 7/1980 | Raseley et al. ......................... 55/426 |
| 4,569,687 | 2/1986 | Feng ...................................... 55/345 |

OTHER PUBLICATIONS

Koch Engineering "Flexichevron Mist Eliminator" (1980).
Munters Corp "Evroform Mist Eliminator" (1976 Est).
Aercology Inc "Mist Collectors" Bulletin No. MC-3/83 (1983).
Perry "Chemical Engineers Handbook" 4th ED. McGraw Hill, New York (1963) pp. 18-82 to 18-88.

Primary Examiner—Charles Hart
Attorney, Agent, or Firm—C. G. Nessler

[57] ABSTRACT

An impingement separator for removing entrained liquids and solids from fluid streams is configured to produce radially inward or outward flow of the fluid within its housing. An array of static impingement members or vanes circumscribes the inlet or outlet port where the fluid flows radially. For inline applications, the preferred device has opposing inlet and outlet port; a central plate divides the housing into two portions connected by a peripheral plenum; and, there are arrays of vanes around both the inlet and outlet port attached to either side of the plate.

8 Claims, 4 Drawing Sheets

RADIAL IMPINGEMENT SEPARATOR

TECHNICAL FIELD

The present invention relates to static impingement type devices for removing solids and liquids from fluid streams; in particular, to the removal of mists from air streams.

BACKGROUND

In the industrial processing of gases and vapors it is often desired to remove small entrained quantities of liquids and solids. Such phase separations are commonly used both in manufacturing process and to prevent the discharge of pollutants to the atmosphere.

One typical application involves the separation of entrained liquids, such as water and oil, from air streams. For instance, a machine tool may generate much mist and fog, as well as solid dusts. Such kinds of contaminants are generally referred to herein as particulates. To prevent pollution of the surrounding areas, fans or blowers are often used to draw room air through the machine housing and carry it to a separator device where the entrained particulate is removed from the stream.

Fabric mesh filters and electrostatic precipitators are among the many devices favored to capture very fine entrained material from an airstream, sufficiently to meet environmental standards. However, when the particulate loading is heavy, such devices can become unduly loaded up and require frequent servicing. Therefore, impingement separator devices may be placed upstream to remove coarser particulate, and thereby produce a more useful system.

Generally, an impingement separator removes liquid (or solid) particulate from a gas stream by causing the stream to flow against the surface of an obstruction. Due to the large momentum of the particulate relative to the gas, the entrained material hits, rather than goes around, the surface of the obstruction. It thus loses its momentum through the impact, and collects upon the surface of the obstruction. It will then ordinarily aggregate with other droplets and flow by gravity to a collection point. Solid particulate can be similarly collected.

There is a large variety of known configuration for impingement separators. An essential impingement separator comprises a nozzle directed against a flat plate placed at right angles to the nozzle. An effective impingment separator is one which gives the desired separation with minimum energy consumption and has low cost and ease of servicing. Nozzles do not fit well with this standard of efficiency, and a common inpingement separator will thus be comprised of an array of simpler shapes, such as bars or vanes, and the like, placed in the gas stream to present a tortuous flow path. Typically, these are wavy, zig-zag, or chevron shaped sheet metal struts. See FIG. 18-144 of Perry, *Chemical Engineers Handbook*, 4th Edition, McGraw Hill, New York (1963pk).

A typical prior art separator consists of a multiplicity of parallel chevron vanes across which fluid flows transversely within a rectangular housing. While such a configuration is suitably applied for use with electrostatic precipitators (which are similarly rectanguloid), it is not suitable for other applications. In particular, it is not convenient to use where relatively small diameter conduits carry gases at relatively high velocity, such as characterize the machine tool application mentioned above. When rectanguloid separators are so applied to a small round duct, the gas must be be diffused and distributed evenly within the rectanguloid vane array, to achieve even low velocities and good separation with low pressure losses. The housing and ducting to achieve this are bulky.

For round line-duct applications, the impingement separator housing will desirably be circular and short in length, with the inlet and outlet co-aligned. Impingement separators have been designed in the suitably circular configuration, but they have not embodied the simplicity and efficiency that characterizes chevron vanes and the like. For example, U.S. Pat. Nos. 552,572 to Austin and 4,214,883 to Raseley et al. show compact devices but they are relatively inefficient in that they comprise simple flat plates. U.S. Pat. Nos. 2,157,829 to Metzgar and 4,014,671 to Andro et al., show how gas is caused to flow across a surface of revolution, which comprises a machined surface. Such are substantially more complicated and heavy to construct, compared to sheet metal vanes.

Thus, there has been a need for improvements in impingement separators. Especially, there has been a need for a low cost line-duct device, such as one which can be simply made from sheet metal, and which provides efficient separation and low loss of fluid stream pressure. There is a need for a separator which is compact and suitable for mounting into small circular conduits, especially in combination with existing filter type separators.

DISCLOSURE OF THE INVENTION

An object of the invention is to provide an improved impingement separator, especially one that has minimal diameter and length and is thus suited for compact installation in line ducts. Another object of the invention is to provide an impingement separator which can be used in combination with existing blower and filter separators, to produce a total unit which has high overall separation efficiency and low cost.

According to the invention, fluid flows radially inward or outward, as it travels from the inlet to the outlet of the housing of the separator device, through a plurality of static impingement elements, such as vanes, disposed more or less circumferentially along the radial flow path, preferably around the inlet or outlet port. When the fluid impinges on the vane array, the entrained liquids or solids are separated and collected in the housing from which they may subsequently be removed.

In a preferred embodiment of the invention, there are two arrays or stages of impingement vanes, one around the inlet as described, and a second around the outlet. The gas flows first radially outward through the first stage as described above, to a plenum portion of the housing, then radially inward through a second impingement vane array, and then to the outlet.

In a more preferred embodiment of the invention, the apparatus has a circular housing with opposing and aligned inlet and outlet ports. There is a central plate within the housing, perpendicular to the centerlines of the ports, to divide the housing into an inlet and and outlet side portion. A single array of z-shaped or chevron vanes is attached to the plate within the inlet side, to encircle the the centerline of the inlet. A second array of vanes is attached to the opposing side of the plate to circumscribe the outlet port. Gas flows radially outward from the port and through the first vane array, to a housing plenum which circumscribes the outer edge of the central dividing plate, and then radially inward, through the second vane array, toward the outlet. In the preferred embodiments the cross sectional flow path area through a vane array changes from the entrance to exit side of the vane array.

The invention is advantageous in being efficient in both construction and operation. It is compact, easily made from sheet metal or molded from plastic at modest cost. In use, it accomplishes good separation while inducing relatively modest pressure loss in the gas stream. In combination with a filter and blower the impingement separator provides a system which accomplishes good continuous separation in severe applications with minimum servicing.

The foregoing and other objects, features and advantages of the invention will become more apparent from the following description of the preferred embodiments and accompanying drawings.

DESCRIPTION OF THE BEST MODE

The best mode of the present invention is described in terms of a particular use which comprises separating liquid (such as oil and oil-water emulsions) mists from an air stream. The entrained matter to be removed from a fluid stream is referred to herein generally as "particulate".

Figure 1:
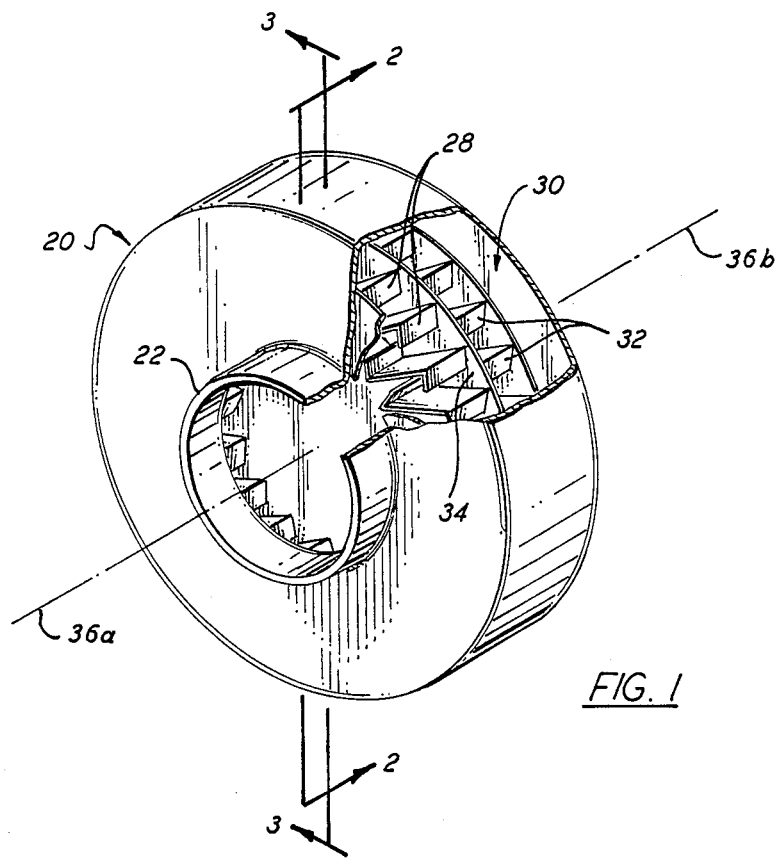
FIG. 1 is a perspective view of a two stage impingement separator with a circular housing, central plate, and co-aligned inlet and outlet.
Figure 2:
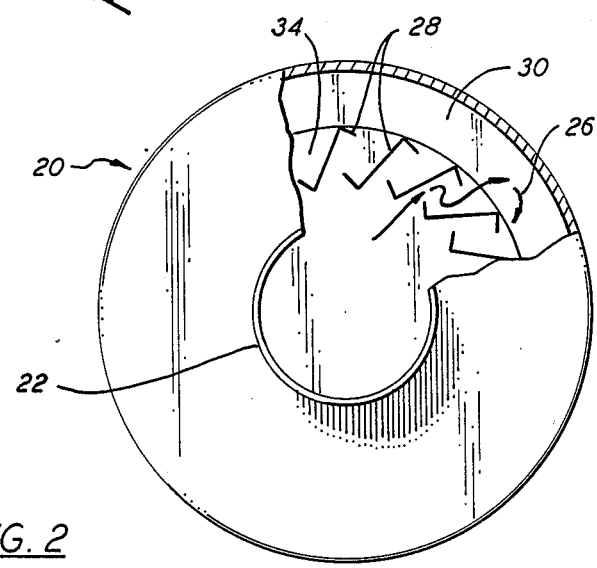
FIG. 2 is a partial cut-away showing the inlet side of the separator of FIG. 1.
Figure 3:
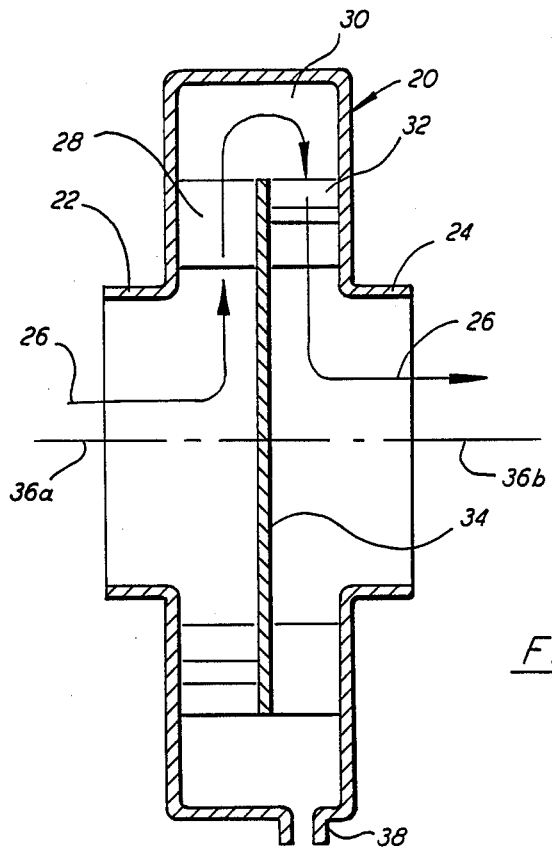
FIG. 3 is a cross sectional view of the separator of FIG. 1.

FIGS. 1-3 show the essential construction of the best mode device. It is a two-stage device contained within a housing 20 having a co-aligned inlet 22 and an outlet 24. The housing is divided into inlet and outlet portions by a central plate 34 which is across and perpendicular to the co-aligned centerlines 36a and 36b of the inlet and outlet ports. In use, the device is connected to a blower or other means for inducing air flow. The configuration of the device causes air to flow along a particular type of flow path 26 from the inlet to the outlet: Air first flows radially outward from the inlet port, through a circular array of z-shape impingement vanes 28, and to an annular shaped plenum space 30; it moves axially in the plenum and then flows radially inward through a second set to z-shape impingement vanes 32 to the outlet 24. A drain 38 enables convenient removal of accumulated liquid.

The two pluralities of impingement vanes 28, 32 are made of sheet metal, and are crimped or spot welded to the plate 34 in the simplest construction. The housing is made of sheet metal as well. All the details of construction are not shown but are easily within the artisan's ordinary skill. Similarly, alternate material, fabrication and assembly schemes will be obvious.

Figure 4:
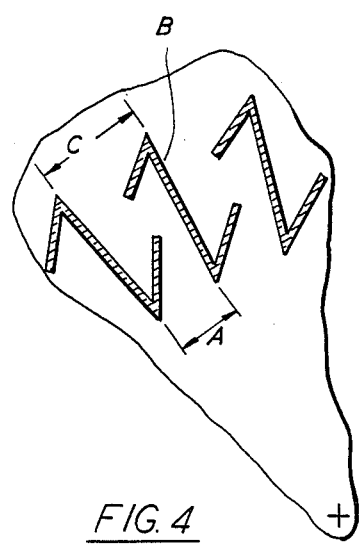
FIG. 4 shows the z-shape vanes of FIG. 2 in more detail, to show the change in flow cross section area which characterizes them.

FIG. 2 and 4 show in more particularity the configuration of the z-shape vanes through which the air flows radially outward and inward. The vanes are symmetrical and made of constant cross section sheet metal. It can be seen that in the characteristic fashion of impingement separators, they create a tortuous flow path. As shown in FIG. 4, the air passes first through a nozzle or throat section A, impinges into a pocket B, and exists through the discharge section C. However, unlike the conventional parallel or rectanguloid array of vanes which is referred to in the Background, in this embodiment of the invention the flow area cross section varies from the entrance to the exit side of the vane row or of the flow area through the row of vanes varies. In the FIG. 2 and 4 instance the flow area increases, in that the area at C is greater than that of A. Thus, the velocity correspondingly changes as the air flows through the vanes, due to the area change. Of course, the radially inward flow of the outlet-related vanes produces a reverse situation. The differential in flow section area, from the upstream to downstream side of the vanes is a result of the combination of the circular disposition and similarity of the vane elements.

Figure 8:
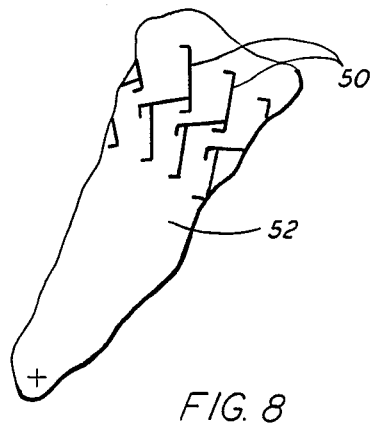
FIG. 8 is an alternative vane configuration of the chevron-type.

The vanes shown in the FIG. 1-4 are referred to here as z-shape. They may also be referred to as chevron shape since the sub-parts comprise such. In the field, the term "chevron" is commonly applied to vanes which have in their configuration some semblance of a v-shape. The term "vane" as used herein is intended to describe any impingement element which disrupts fluid flow and causes particulate separation. It will be evident that other impingement separator elements, many of which are known, whether called vanes or not, can be used in place of the particular vanes shown for these preferred embodiments. As one example, see the more elaborate chevron shape vanes 50 mounted on plate 52 of FIG. 8.

Figure 7:
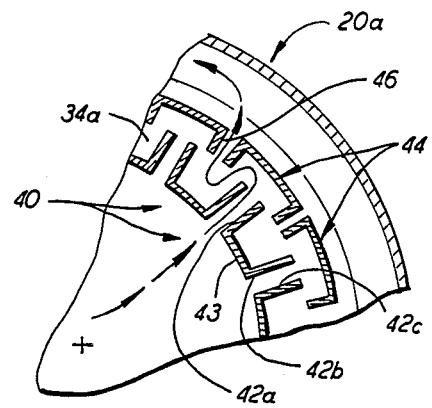
FIG. 7 is an alternative vane configuration, where the flow area through the vanes is constant in the radial direction.

As a less preferred alternative, the vanes can be shaped to maintain a constant flow cross section, despite the circular disposition. FIG. 7 shows one such alternative (but more complex) vane configuration mounted on a plate 34a contained within housing 20a. The u-shape vane parts 40 have sides 42a, 42b which diverge from the base 43 so that sides 42b, 42c of adjacent nozzle parts 40 are parallel. The sides 46 of the impinged-on parts 44 are similarly shaped, except to form converging angles with the bases. The cross section of the flow path at the entrance and exit of the vane array may thus readily be made equal.

Figure 5:
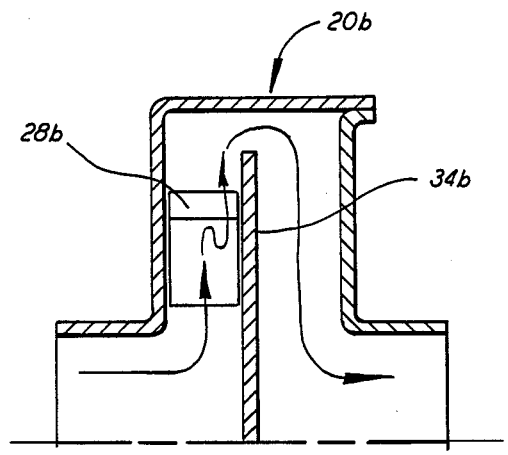
FIG. 5 is a single stage separator.

The essential invention needs only embody one array of vanes. In the embodiment shown in FIG. 5, a single set of vanes 28b is attached to a plate 34b mounted in a housing 20b.

Figure 6:
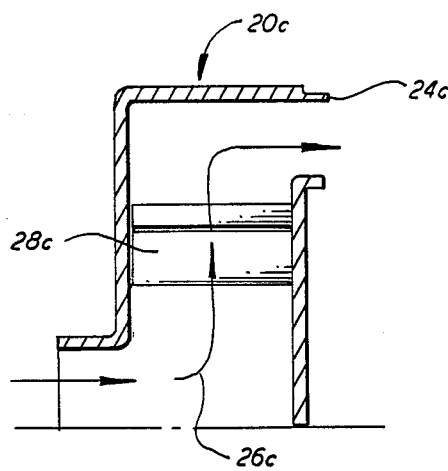
FIG. 6 is a single stage separator where the outlet is not coaligned with the inlet.

The plate 34, 34b is part of the preferred embodiment but may be omitted in certain other embodiments. One such is shown in FIG. 6, where vanes 28c extend across the the whole length of the housing 20c. In this embodiment, an outlet 24c is located in the vicinity of the plenum area. The outlet it may be either an annular space or a series of space apart ports. Also, while in the best embodiment of the invention there is a circular housing interior, in special applications other shapes may be used.

While the simplest and best construction is to have the vanes arrayed as shown in a complete circle around the inlet or outlet, such is not essential. In the general mode of the invention, vanes are disposed in the radial portion of the flow path, more or less circumferentially about the inlet or the outlet. Noncircular and partial or incompletely circumscribing arrays can be used and such are contemplated within the meaning of the terms "circumscribing" and "circumferentially" as used herein. Of course, on the other hand, it is within anticipation that additional (e.g., concentric) rows of circumferential vanes may be used, analogous to the multiple rows of known rectanguloid separators.

The best and normal use of the invention entails air flowing in the direction indicated by the arrows of the flow path 26c in FIG. 6 (and corresponding flow paths 26 in the other Figures as well). But, the inventions can also be used when air is flowed in the reverse direction.

Figure 9:
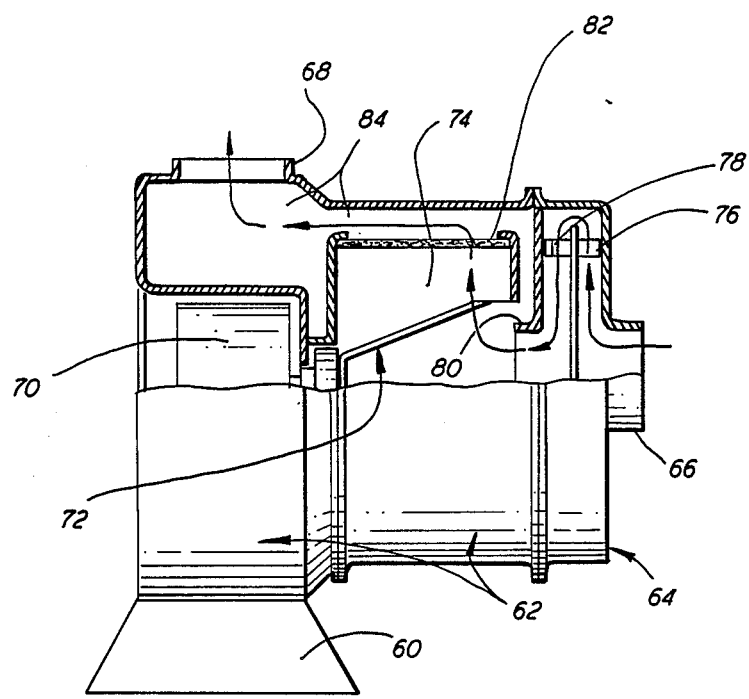
FIG. 9 is a combination blower, filter, and impingement separator unit.

FIG. 9 shows the invention as a combination with a blower unit which has an integral permeable material filter. Such a filter and blower unit is shown in U.S. Pat. No. 3,800,514 to Avondoglio et al. and U.S. Pat. No. 3,857,687 to Hamilton et al., the disclosures of which are hereby incorporated by reference. The combination has a base 60 on which is mounted the combination blower and filter housing 62. The impingement separator housing 64 is attached to the housing 62. A principal inlet 66 on the housing 64 is connectable to the source of the air needing cleaning. A principal outlet 68 on the housing 62 discharges the cleaned air. A blower motor 70 rotates the centrifugal type impeller 72 which has air moving vanes 74 (one of which is shown) to thereby induce flow through the unit. A filter media element 82 made of mesh, fabric, felt or sponge material, or the like, surrounds and is mounted on the rotatable impeller of the blower. (Of course, such mesh type filters are known to be useful for phase separation and conceptually are a variation of impingement separator when applied to liquid separations.)

In operation, air enters the inlet 66 and flows through the two vane arrays 76, 78 of the impingement separator, and then from the inpingement separator outlet 80 through the impeller 74. The air is forced through the filter 82, into the combination filter and blower plenum 84, and thence to the outlet 68. The heavier particulate in the air stream is captured in the impingement separator housing 64, while the remaining particulate agglomerates on the interior of the filter. If a liquid particulate is present, the larger agglomerations are thrown to the interior wall of the housing and they then flow to an unshown drain at the bottom of the housing. The resultant two stage particulate removal extends the life or servicing of the filter part, and makes the whole unit much more effective than either the filter or impingement separator would be alone. The assmebly represents and optimum combination of compactness and effectiveness, with low construction cost.

It will be evident that a blower in an assembly like the foregoing, could be placed either downstream of the filter or upstream of the impingement separator, and still fulfill its essential function of inducing flow through the unit; also, other diverse means for inducing flow may be used in place of the blower.

The size of the impingement separator will be varied to suit the application. One configuration, like that shown in FIG. 1 and FIG. 9, for application to a 6 inch dia air duct and oil mist entrainment will have the following nominal dimensions. There will be a housing of 11 inch outside diameter; the vane array circle will have a mean diameter of 9.25 inch; the vanes will have a length (height) of 1.5 inch; each sheetmetal vane piece will have a body portion of 2 inch length and z-ends of 1 inch length, with a 70 degree angle between each z-end and the body. The mean flow cross sectional area of the impingement vane array will be 0.151 sq ft. This will produce a mean inpingement velocity of 3311 fpm when a design-rated 500 cfm of air flows through the unit. The velocity pressure in the vane array will be about 0.68 inch water column, compared to 1.62 inch water column in the 6 inch dia duct. The comparatively lower velocity is desirable in the present and any other impinger because it assists mist separation and minimizes losses.

While the invention has been described here in terms of the removal of liquid mist from air, the invention is also useful for separating liquid particulates from all gases, and it may be applied as are other like devices to the removal of solids from gases, and to the removal of entrained matter from liquids.

Although the invention has been described with respect to the preferred embodiment and some alternatives, it will be understood by those skilled in the art that various further changes in form and detail thereof may be made without departing from the spirit and scope of the claimed invention.

I claim:

1. Apparatus for removing entrained particulate from a fluid stream comprising a housing, having an inlet port an outlet port, a plate within the housing mounted perpendicular to the centerline of the inlet port, the housing and other parts mounted therein configured to cause a fluid stream within the housing to follow a flow path which runs radially outward from the inlet across the plate, and then to the outlet; and, a plurality of impingement vanes within the housing mounted generally circumferentially around the inlet port on the plate or part of the housing which lies perpendicular to the inlet port centerline, so that the radially outward flowing fluid stream and entrained particulate impinges on the vanes, to cause the particulate to thereby be separated by impingement from the fluid stream.

2. The apparatus of claim 1 characterized by co-aligned inlet and outlet port centerlines; and, means mounted within the housing for separating the inward and outward portions of the flow path.

3. The apparatus of claim 1 characterized by symmetrical z-shaped vanes of constant cross section material.

4. The apparatus of claim 1 characterized by a flow path which has a radially inward running portion flowing across the plate to the outlet port, said portion being downstream from the radially outward portion thereof, the plate separating the the outward and inward portions of the flow path;

an annular space within the housing circumscribing the outer periphery of the plate, through which the flow path passes going from the first to the second side of the plate; and a second plurality of impingement vanes within the housing, mounted generally circumferentially about the outlet port on the plate or a housing part which is perpendicular to the outlet port centerline, so that the radially inward flowing portion of the fluid stream impinges on the second vane plurality and causes additional separation of any particulate which remains in the fluid stream.

5. The apparatus of claim 4 characterized by vanes which form a plurality of diverging nozzles at the radially outward portion of the flow path and a plurality of converging nozzles at the radially inward portion of the flow path.

6. The apparatus of claim 4 wherein the housing interior is generally circular.

7. Apparatus for removing entrained particulate from a gas stream comprised of (a) an impingement separator, having a generally circular housing with a co-aligned inlet and outlet and a plenum around its interior periphery; a plate mounted in the housing, perpendicular to co-alignment of the inlet and outlet, to cause inlet gas to flow first radially outward to the plenum, and then radially inward from the plenum to the outlet; a first and a second set of impingement vanes, each mounted on opposing sides of the plate so they are respectively in the radially outward and radially inward portions of the flow path, to cause the bulk of the entrained particulate to be separated from the gas stream;

(b) a filter, having a generally circular second housing with an inlet and an outlet; the inlet connected to the the impingement separator housing outlet; filter media mounted circumferentially within the second housing; the filter parts configured to cause gas entering the inlet to flow radially through the media and toward the outlet, to cause further amounts of particulate to be separated from the gas stream; and (c) means connected to the filter, for inducing flow of gas from the inlet to the outlet of the filter, thereby inducing flow through the impingement separator connected to the filter, and for causing discharge from the filter of gas from which entrained particulate has been substantially removed.

8. Apparatus of claim 7 characterized by means for inducing flow which is a blower contained within the circumference of the filter media within the second housing.

* * * * *